Dec. 10, 1968     S. A. BUSH     3,415,977

RESISTANCE WELDING

Filed Sept. 23, 1966

INVENTOR.
Stuart A. Bush
BY

United States Patent Office 3,415,977
Patented Dec. 10, 1968

1

3,415,977
RESISTANCE WELDING
Stuart A. Bush, Lafayette, Colo., assignor to the United
States of America as represented by the United States
Atomic Energy Commission
Filed Sept. 23, 1966, Ser. No. 582,209
3 Claims. (Cl. 219—149)

This invention relates to welding and more particularly to effecting a seal in a tubular member by resistance welding. There are many instances in which it is desirable to effectively and permanently seal-off a tubulation or conduit, e.g., a tubular member of a barometric device such as a barometric switch. Efforts to effectively seal such tubular members by resistance welding methods heretofore have met with difficulty in that there have resulted small, pin-hole leaks, cracks at or near the weld, the objectionable expulsion of metal from the weld, or a combination of these defects, any of which may result in the failure to properly seal together the tube wall portions. The chance of failure increases as the number of defects compounds. The novel process and electrodes disclosed and claimed herein overcome the defects of the prior art and may be used to accomplish the hermetic sealing together of the wall portions of a tubular member. Moreover, the method and apparatus disclosed herein may be used to hermetically seal tubular members composed of a wide variety of metals, such as copper, stainless steel, aluminum, etc.

It is an object of this invention to provide a novel resistance welding process.

It is another object of this invention to provide a novel method for effecting the sealing of a tubular member, and to provide a sealed tubular member produced by such method.

It is another object of this invention to provide a novel resistance welding method for sealing a tubular member.

It is another object of this invention to provide a novel resistance welding electrode.

This specification, including the description, drawing, and claims, has been prepared in accordance with the applicable patent laws and the rules promulgated under the authority thereof.

The method for effecting a hermetic seal in a tubular member as disclosed herein comprises a two stage welding technique. The first step is to initially forge or flatten the tubular member along a significant zone length so as to obtain at least some joining of oppositely disposed wall portions, and the second step is to weld together walls of the member at a zonal area disposed within the confines of the initially forged zone. In actuality, some welding is accomplished in the first step and some further forging and flattening takes place in the second step. As brought out in greater detail hereinafter, neither the initial nor the secondary step alone is deemed to provide the desired seal, but their combination does furnish the optimum sealing-off.

Figure 1:
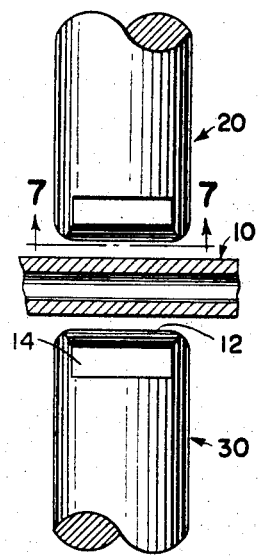
FIGURE 1 is a partial sectional view of a tubular member positioned between welding electrodes.

A tubular member 10 may preferably be positioned with its longitudinal axis parallel to the longer, or forging axis, of two identical electrodes or welding heads, 20 and 30, as shown in FIGURE 1. The member 10 may be held or supported intermediate the reciprocable welding heads by way appropriate means (not shown). If desired, one electrode could be stationary and the tubular member could be supported thereon.

Figure 2:
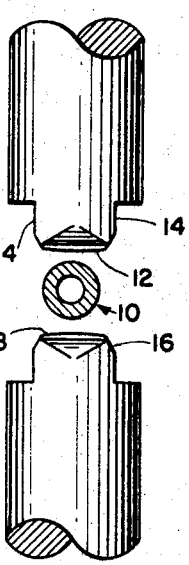
FIGURE 2 is a view taken at a right angle to FIGURE 1.
Figure 6:
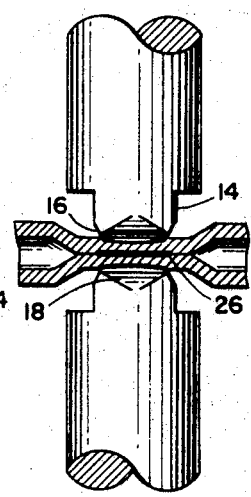
FIGURE 6 is a view taken at a right angle to FIGURE 5.
Figure 7:
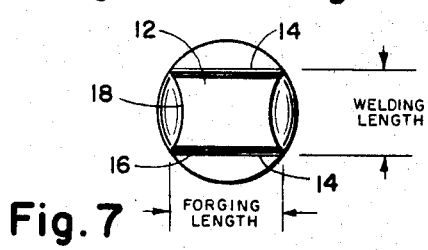
FIGURE 7 is a view taken on line 7—7 of FIGURE 1.

Each electrode may comprise a substantially cylindrical member of an appropriate conductive material, such as wrought copper, having the requisite strength and heat resistant properties. The head of each electrode may include a substantially flat, planar area 12 of a generally rectangular configuration (see FIGURE 7). The term "substantially flat" is used although the head may have a slight convex radius as shown in FIGURES 2, 4, and 6. The slight radius may aid in the smooth deformation of the tubular member during the forging step (see FIGS. 3 and 4) and may aid in concentrating both pressure and welding current centrally within the preflattened portion during the welding step (see FIG. 6) as will be described hereinafter. Diametrically opposite portions of the head may be relieved or chamfered as at 14. The chamfers, parallel to each other, may provide the head with the substantially rectangular configuration as discussed previously, and thus may impart to the head the difference between the longer forging length and the shorter welding length, as illustrated in FIGURE 7, and as may be seen in the respective pairs of figures. Bevelled portions 16 may provide a transition between the side wall of chamfer 14 and the slight convex area 12, qualifiedly characterized previously as "substantially flat." The forging length of the electrode may be curved as at 18 to provide a smooth transition from the planar area 12 to the cylindrical section of the electrode head.

The forging length of the electrodes provides a relatively elongated surface with smoothly rounded ends. With the forging length parallel to the longitudinal axis of the tubular member, as shown in FIGURE 1, it may be understood that a maximum length of electrode, with smoothly transitioned ends, is thus presented to the tubular member. And, as shown in FIGURE 2 the width of the electrode (which comprises the welding length) as presented to the tubular member, may be wider than the outside diameter of the member. The pressure (and heat) which may be initially applied is thus distributed over a substantial area of the tubular member by a planar surface area and a substantially smoothly curved surface devoid of sharp or abrupt edges which could cause cracks, fractures, metal expulsion, or other undesirable effects.

Under operative circumstances, after the tubular member is positioned with its longitudinal axis parallel to the forging lengths or forging axes of the coaxially aligned welding heads, suitable pressure, mechanical, hydraulic, or other, may be simultaneously applied to the heads and subsequently transferred thereby to the tubular member to squeeze together oppositely disposed wall portions of said tubular member. A welding current is preferably applied to the electrodes simultaneously with the application of pressure. The resulting heat and pressure may forge the tubular member along its longitudinal axis. The amount of pressure applied may vary according to the composition, diameter, and wall thickness of the tubular member. However, for any specific tubular member the pressure may be constant for both steps and may be expressed in pounds. The current density may similarly vary according to the tubular parameters and may also be constant for both steps. The current may preferably be applied by an impulse type machine, which may apply the current in equal time increments and in a series of variable amperages. For example, the current, comprising several thousand amps at about one and one-half volts, may be applied in eight increments or impulses of about one-sixtieth of a second each, with a given or fixed delay or rest time between increments. Furthermore, the eight increments may comprise four increments of about 9,000 amps and four increments of about 15,000 amps. Such current application is well known in the resistance welding art.

Figure 3:
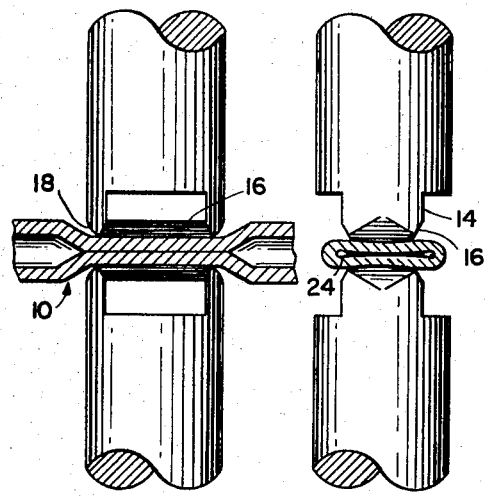
FIGURE 3 is a partial sectional view after the electrodes have initially squeezed the tubular member.
Figure 4:
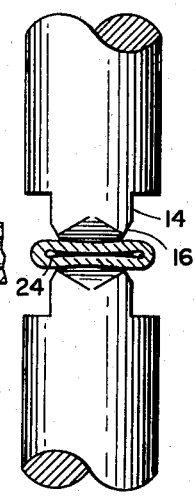
FIGURE 4 is a view taken at a right angle to FIGURE 3.

FIGURES 3 and 4 illustrate the forging step. FIGURE 3 shows the tubular member in cross section along its longitudinal axis and indicates the relatively long length of the member that is subjected to the foregoing operation and that is thereby flattened.

FIGURE 4, at right angles to FIGURE 3, shows a transverse section of the tubular member at or near completion of the initial forging operation. This first major step may result in a substantially closed member free from the objectionable cracks which generally result from cold working such a tubular member. Moreover, no metal expulsion from either end of the flattened closed portion takes place. However, as exaggeratedly illustrated in FIGURE 4, the initial forging operation may not result in a hermetic seal, but may leave small, pin-hole apertures 24 or leaks at the diametral extremities of the forged area. The central area, as shown in FIGS. 3 and 4, is essentially squeezed together. The initial forging is primarily a physical deformation process rather than a welding process and the tubular member is therefore primarily squeezed rather than welded. Even though the pressure and current density during this initial operation may be substantially the same as that used in the second major operation, the welding step, an optimum hermetic seal is usually not accomplished in the initial or forging step.

The axial flattening may result in an increase in the "width" of the tubular member in the flattened area as well as a flattening or reduction in "height" as compared to the diameter of the member prior to the forging step. This increased width and decreased height may be seen by comparing FIGURE 2 with FIGURE 4, and FIGURE 1 with FIGURE 3 and by viewing FIGURE 8, which illustrates in perspective the resulting configuration of the tubular member.

Figure 5:
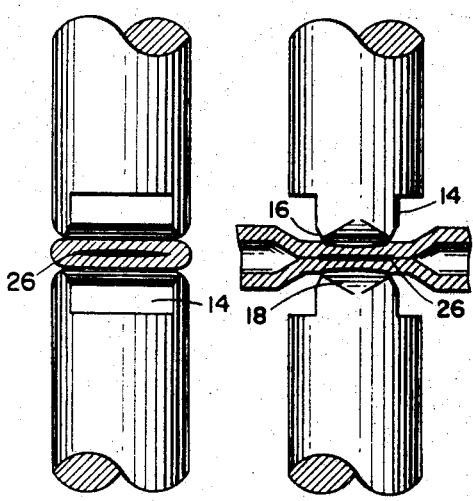
FIGURE 5 is a view showing the final electrode position with the tubular member rotated 90 degrees.

After the initial flattening or forging operation, the current and pressure may be discontinued, and the electrodes may be withdrawn or separated. Upon withdrawal of the electrodes the tubular member may be rotated ninety degrees such that its longitudinal axis will be perpendicular to the shorter, welding length or axis of the welding head, as shown in FIGURES 5 and 6. The electrodes may be centered in the preflattened area. The centering of the electrodes in the preflattened portion prevents arcing between the electrodes and the nonflattened portion of the tubular area. Metal expulsion would result from any such arcing. As illustrated, the pressure and current may now be concentrated over a lesser area with respect to the longitudinal axis of the tubular member than during the initial flattening operation. While the initial forging or flattening may be accomplished along the longitudinal axis of the tubular member as illustrated in FIGURES 1 and 3, the welding may thereafter be accomplished along the transverse or diametral axis of the tubular member, as illustrated in FIGURES 5 and 6.

The concentration of pressure and heat from the electrodes in a portion of the preflattened, forged area may serve to provide a tight close-off 26 in the tubular member. Due to the prior forging over a greater area than that in which the final welding takes place, the closure area 26 may be characterized as "conditioned" for the final welding. This "conditioning" appears to preclude metal expulsion, cracking, etc. during or resulting from the welding step.

FIGURES 5 and 6 illustrate the welding of the walls of the tubular member during the welding step. It may be seen in FIGURE 6 that the actual welding of the tubular member takes place along a substantial axial length of the member, although such length is less than that of, and is within the confines of, the preflattened area. As indicated by reference numeral 26, the actual welded or sealed-off portion may comprise an area (or a volume) in which the metal of the tubular member has undergone a substantially complete melting and recrystallizing as a result of the applied heat and pressure from the welding step.

Figure 8:
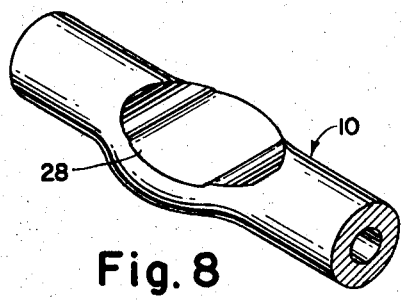
FIGURE 8 is a perspective view of a sealed tubular member.

As previously indicated, some flattening takes place during the welding step. This flattening, comprising a depression 28, adjacent the welded, hermetic seal 26, is shown in FIG. 6 and FIG. 8. FIG. 6 shows the electrodes slightly penetrating the preflattened area of the tubular member during the welding step, forming a depression. The depression is illustrated in FIG. 8 and is identified by reference numeral 28. The preflattened or physically deformed area, which may include portions of the member in which some melting and recrystallization may result from the forging operation, may extend axially beyond the welded portion 26, as shown in FIGURE 6.

FIGURE 8 is a perspective view of a sealed tubular member illustrating the enlarged width and the decreased height. The use of both pressure and heat from the welding current during the initial forging step results in the smooth deformation of the tubular member, as shown in FIGURES 3 and 8. This, in turn, precludes cracking at deformation points, metal expulsion, and other undesirable effects. FIGURE 8 and FIGURES 3 and 4 illustrate the conditioning effect of the initial forging operation. The tubular member, as a result of the forging operation, may be smoothly preflattened over an area greater than that in which the final welding may take place. While conditioning or preflattening may include some welding or plastic deformation of the walls of the tubular member, as previously discussed, it is the welding step which may affect a hermetic seal over a substantial axial length of the tubular member in the conditioned or preflattened area.

Thus, the novel method, utilizing the novel electrodes developed therefor, provides an efficient and inexpensive process for hermetically sealing a tubular member.

I claim:

1. The method of joining together oppositely disposed wall portions of a tubular member and effecting a hermetic seal in a tubular member by resistance welding comprising the steps of, positioning a tubular member to be welded with its longitudinal tubular axis generally parallel to the forging length of and intermediate a pair of resistance welding electrodes, applying a force to at least one of the electrodes to squeeze together between them and flatten and at least partially join together said wall portions of the tubular member and simultanously with said squeezing applying an electric current between the electrodes and through said tubular member, rotating the tubular member so as to position said flattened and forged wall portions generally parallel to and intermediate said pair of electrodes with the electrodes spanning the width of the flattened interior diameter of said tubular member at a location intermediate and spaced from longitudinally spaced ends thereof, and applying a force to at least one of the electrodes to further squeeze together portions of oppositely disposed wall portions of the preflattened area of the tubular member and simultaneously with said further squeezing applying an electric current between the electrodes and through said portion of flattened tubular member to effect a hermetic welded seal in said tubular member.

2. The method of claim 1 in which the same current density is applied for both preflattening and welding.

3. A tubular member having a hermetic seal thereacross produced by the method set forth in claim 1.

References Cited

UNITED STATES PATENTS

| 2,554,328 | 5/1951 | Grimes | 219—149 X |
| 2,568,911 | 9/1951 | Cox et al. | 29—475 |
| 3,290,477 | 12/1966 | Chopp | 219—149 |

FOREIGN PATENTS 490,586   8/1938   Great Britain.

RICHARD M. WOOD, *Primary Examiner.*

B. A. STEIN, *Assistant Examiner.*

U.S. Cl. X.R.

219—117; 228—60; 29—475